(12) United States Patent
Bindl

(10) Patent No.: US 8,640,812 B2
(45) Date of Patent: Feb. 4, 2014

(54) ELECTRIC DRIVE AXLE CONFIGURATION

(75) Inventor: Reginald M. Bindl, Dubuque, IA (US)

(73) Assignee: Deere & Company, Moline, IL (US)

( * ) Notice: Subject to any disclaimer, the term of this patent is extended or adjusted under 35 U.S.C. 154(b) by 163 days.

(21) Appl. No.: 13/418,394

(22) Filed: Mar. 13, 2012

(65) Prior Publication Data

US 2013/0240282 A1 Sep. 19, 2013

(51) Int. Cl.
*B62D 9/00* (2006.01)

(52) U.S. Cl.
USPC .......................... 180/255; 180/411; 180/6.48

(58) Field of Classification Search
USPC ............... 180/255, 254, 411, 6.5, 6.48
See application file for complete search history.

(56) References Cited

U.S. PATENT DOCUMENTS

| | | | |
|---|---|---|---|
| 3,456,458 A * | 7/1969 | Dixon | 464/109 |
| 3,527,315 A * | 9/1970 | Hampton | 180/238 |
| 3,983,951 A * | 10/1976 | Guerra | 180/260 |
| 4,258,818 A * | 3/1981 | Uzu | 180/233 |
| 4,482,025 A * | 11/1984 | Ehrlinger et al. | 180/255 |
| 4,545,458 A * | 10/1985 | Jones | 180/255 |
| 4,821,834 A * | 4/1989 | Hueckler et al. | 180/255 |
| 5,472,062 A * | 12/1995 | Nagai et al. | 180/252 |
| 5,921,338 A * | 7/1999 | Edmondson | 180/65.51 |
| 6,319,132 B1 * | 11/2001 | Krisher | 464/143 |
| 8,267,205 B2 * | 9/2012 | Ishii et al. | 180/6.44 |
| 2004/0192446 A1 * | 9/2004 | Bigelow et al. | 464/50 |

* cited by examiner

*Primary Examiner* — Tony Winner
(74) *Attorney, Agent, or Firm* — Stephen F. Rost; Taft, Stettinius & Hollister LLP

(57) ABSTRACT

The present disclosure provides a front axle of a vehicle including a motor disposed near the center of the axle and a shaft coupled at one end thereof to the motor, where the shaft defines a first axis. A first gear is coupled to a second gear, the first gear being coupled to the shaft at an end opposite the motor and being disposed along the first axis. The second gear is disposed along a second axis, where the first axis and second axis are substantially parallel to but spaced from one another. A steering pivot defines a steering axis about which a final drive assembly pivots and a wheel lean pivot defines a lean axis about which the final drive pivots. The lean axis is substantially perpendicular to the steering axis. A constant-velocity joint is disposed at the intersection of the steering axis and lean axis.

20 Claims, 6 Drawing Sheets

ELECTRIC DRIVE AXLE CONFIGURATION

FIELD OF THE INVENTION

The present invention relates to a front wheel axle of a work vehicle, and in particular, to an electric drive axle configuration that provides for a full range of motion about a steering pivot and wheel lean pivot.

BACKGROUND OF THE INVENTION

Work vehicles, such as a motor grader, can be used in construction and maintenance for creating a flat surface. When paving a road, a motor grader can be used to prepare a base foundation to create a wide flat surface for asphalt to be placed on. A motor grader can include two or more axles, with an engine and cab disposed above the axles at the rear end of the vehicle and another axle disposed at the front end of the vehicle. A blade is attached to the vehicle between the front axle and rear axle.

The present disclosure is not exclusively directed to a motor grader, but rather can extend to other powered vehicles as well. For exemplary and illustrative purposes, however, the present disclosure will focus on a motor grader. In FIG. 1, for example, a conventional motor grader 100, such as the 772G Motor Grader manufactured and sold by Deere & Company, includes front and rear frames 102 and 104, respectively, with the front frame 102 being supported on a pair of front wheels 106, and with the rear frame 104 being supported on right and left tandem sets of rear wheels 108. An operator cab 110 is mounted on an upwardly and forwardly inclined rear region 112 of the front frame 102 and contains various controls for the motor grader 100 disposed so as to be within the reach of a seated or standing operator, these controls including a steering wheel 114 and a lever assembly 116. An engine 118 is mounted on the rear frame 104 and supplies power for all driven components of the motor grader 100. The engine 118, for example, can be configured to drive a transmission (not shown), which is coupled for driving the rear wheels 108 at various selected speeds and either in forward or reverse modes. A hydrostatic front wheel assist transmission (not shown) may be selectively engaged to power the front wheels 106, in a manner known in the art.

Mounted to a front location of the front frame 102 is a drawbar 120, having a forward end universally connected to the front frame 102 by a ball and socket arrangement 122 and having opposite right and left rear regions suspended from an elevated central section 124 of the front frame 102 by right and left lift linkage arrangements including right and left extensible and retractable hydraulic actuators 126 and 128, respectively. A side shift linkage arrangement is coupled between the elevated frame section 124 and a rear location of the drawbar 120 and includes an extensible and retractable side swing hydraulic actuator 130. A blade 132 is coupled to the front frame 102 and powered by a variable displacement circle drive motor 134.

Referring to FIG. 2, a front axle 200 of the conventional motor grader 100 is shown in greater detail. The front axle 200 includes a first side 202 and second side 204 to which front wheels 106 are coupled. A portion 206 of the front frame 102 is shown in which the first side 202 and second side 204 each include a final drive assembly 208. In this conventional grader, a hydraulic motor (not shown) is disposed in the final drive assembly 208 to drive the corresponding front wheel. In other words, a hydraulic motor (not shown) is mounted at the first end 202 and second end 204 of the front axis 200. A wiring and hydraulic hose bundle 218 is coupled to each hydraulic motor and passes through the front frame 102 at different locations. The bundle 218 also attaches to different portions of the vehicle.

To achieve complete motion, a lean bar 210 is coupled to the front frame 102 and lean castings 214. A steering casting 212 is also disposed at each end of the front axle 200 to allow the front wheels 106 to steer about a steer pivot. A guard 216 is also provided at each end adjacent the final drive assembly 208. The configuration of the front axle 200 is such that sufficient clearance is provided between a ground surface and the axis 200 to aid with vehicle performance.

New technology, however, is being introduced to convert a conventional motor grader to an electric drive motor grader. To convert a hydrostatic system to an electric drive system, however, the front axle of the grader is reconfigured to accommodate an electric motor. In particular, an electric motor can be larger in size compared to a hydraulic motor and thus packaging the electric motor within a conventional final drive assembly is problematic due to space constraints. In the conventional final drive assembly 208, a planetary drive hub (not shown) is driven by the hydraulic motor. Due to its larger size, however, the electric motor will contact a portion of the front frame and reduce the overall performance of the vehicle. For instance, if an electric motor is packaged in the conventional final drive assembly, the vehicle would likely have reduced steering capabilities and require changes to the pivot points of the axle (and thus possibly negatively affect the axle's lean capabilities). In addition, if the electric motor were mounted at the same location in a conventional final drive assembly, wiring issues would arise as cables between the motor and other parts of the vehicle would have to flex for many steering and wheel lean movement thereby inducing problems in the wiring system.

A need therefore exists to provide a reconfigured layout of a front axle of an electric drive vehicle that satisfies space constraints, provides for complete vehicle performance, and protects the wiring system of the vehicle. In addition, it is desirable to achieve sufficient clearance between the front axle and ground surface to achieve optimal vehicle performance.

SUMMARY

In an exemplary embodiment of the present disclosure, a front axle of a vehicle includes a motor disposed near the center of the axle and a shaft coupled at one end thereof to the motor, where the shaft defines a first axis. A first gear is coupled to a second gear, the first gear being coupled to the shaft at an end opposite the motor and being disposed along the first axis. The second gear is disposed along a second axis, where the first axis and second axis are substantially parallel to but spaced from one another. The front axle also includes a final drive assembly coupled to the second gear at one end of the axle. A steering pivot defines a steering axis about which the final drive assembly pivots and a wheel lean pivot defines a lean axis about which the final drive pivots. The lean axis is substantially perpendicular to the steering axis. A constant-velocity joint is disposed at the intersection of the steering axis and lean axis.

In one aspect of this embodiment, the motor is an electric motor. A second motor can be disposed adjacent the first motor near the center of the axle. The front axle can also include a second final drive assembly disposed at an end of the axle opposite the first drive assembly such that the second final drive assembly is pivotal about a second steering axis and a second lean axis. A second constant-velocity joint can be disposed at the intersection of the second steering axis and second lean axis. The second motor can be disposed along the first axis and the second final drive assembly can be disposed along the second axis. In another aspect, the steering axis is substantially perpendicular to the first and second axes. In a different aspect, the first gear can be integrally coupled to the shaft. In addition, the diameter of the first gear can be approximately 0.25-0.75 the diameter of the second gear.

In another embodiment, a front axle of a motor grader is provided having a first end and a second end. The axle can include an electric motor disposed near the center of the front axle, a shaft coupled at one end to the motor, and a portal gearset including a first gear coupled to a second gear. The first gear can be coupled to the shaft at an end opposite the motor. A final drive assembly can be disposed at the first end and second end of the axle such that the final drive assembly is coupled to the second gear and configured to couple to a front wheel. The front axle can include a steering pivot about which the final drive pivots. The steering pivot defines a steering axis. The axle can further include a wheel lean pivot defining a lean axis about which the final drive pivots. The lean axis is perpendicular to the steering axis. The front axle can also include a constant-velocity joint disposed at the intersection of the steering axis and lean axis.

In one aspect of this embodiment, the diameter of the second gear can be approximately twice the diameter of the first gear. Further, the first gear can be integrally coupled to the shaft. In another aspect, the first gear is disposed along a first axis and the second gear is disposed along a second axis, the first axis and second axis being substantially parallel to but offset from one another. The steering axis can be substantially perpendicular to the first and second axes.

In a different embodiment, an electric drive motor grader includes a front frame and a rear frame; a first axle and a second axle, the first axle being coupled to the front frame and the second axle being coupled to the rear frame; an electric motor disposed near the center of the first axle and a shaft coupled to the motor; a portal gearset including a first gear coupled to a second gear, the first gear being coupled to the shaft at an end opposite the motor; a final drive assembly disposed at the first end and second end of the first axle, the final drive assembly being coupled to the second gear and configured to couple to a front wheel; a steering pivot about which the final drive pivots, the steering pivot defining a steering axis; a wheel lean pivot defining a lean axis about which the final drive pivots, the lean axis being perpendicular to the steering axis; and a constant-velocity joint disposed at the intersection of the steering axis and lean axis.

In one aspect of this embodiment, a second electric motor can be disposed adjacent the first motor near the center of the first axle. The grader can also include a second final drive assembly disposed at an end of the first axle opposite the first drive assembly, the second final drive assembly being pivotal about a second steering axis and a second lean axis; and a second constant-velocity joint disposed at the intersection of the second steering axis and second lean axis. In another aspect, the first gear can be disposed along a first axis and the second gear can be disposed along a second axis, the first axis and second axis being substantially parallel to but offset from one another. Related thereto, the first and second electric motors can be disposed along the first axis and the first and second constant-velocity joints are disposed along the second axis. In addition, the steering axis can be substantially perpendicular to the first and second axes. In a different aspect, the diameter of the first gear can be approximately 0.25-0.75 the diameter of the second gear.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
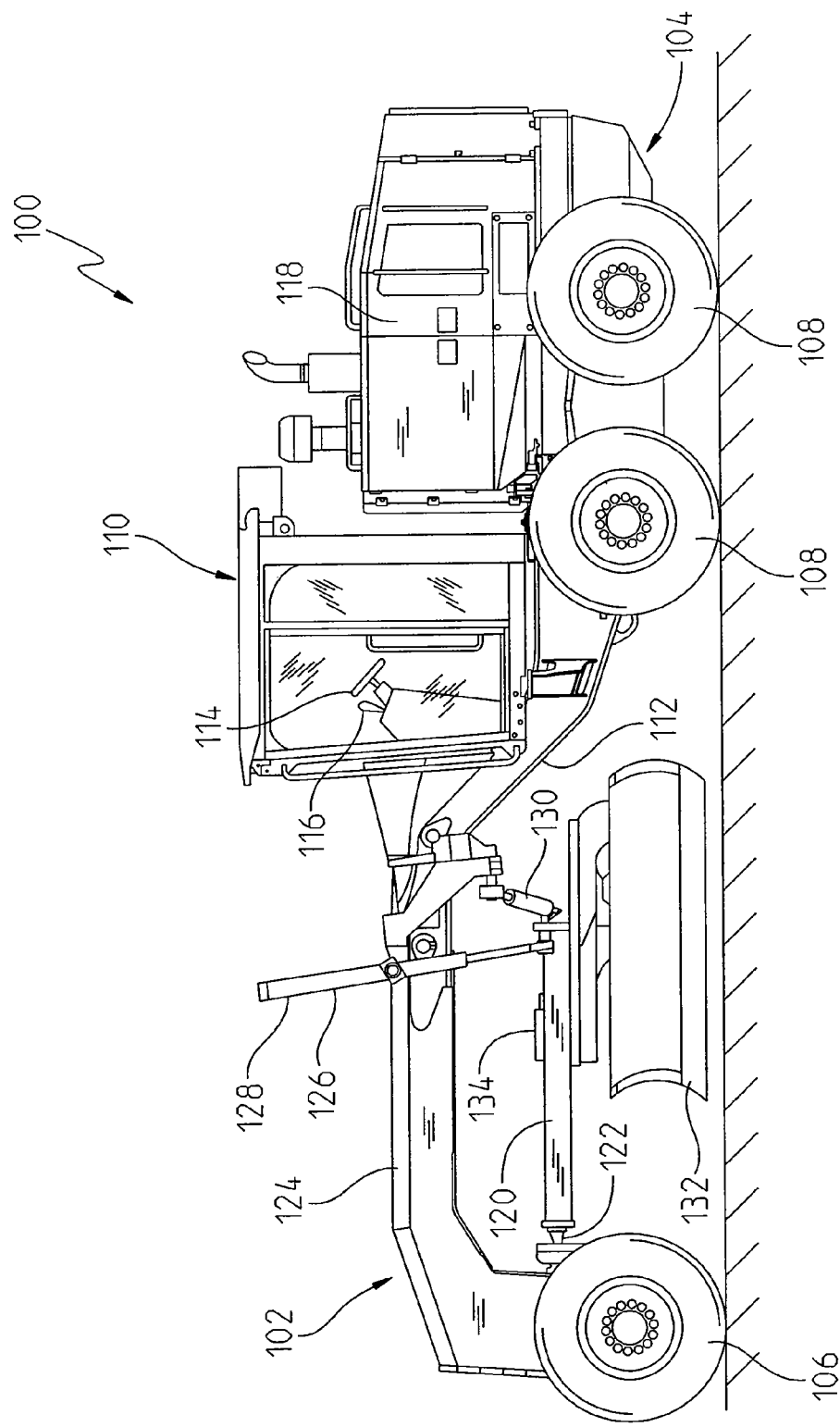
FIG. 1 is a side view of a conventional motor grader.
Figure 2:
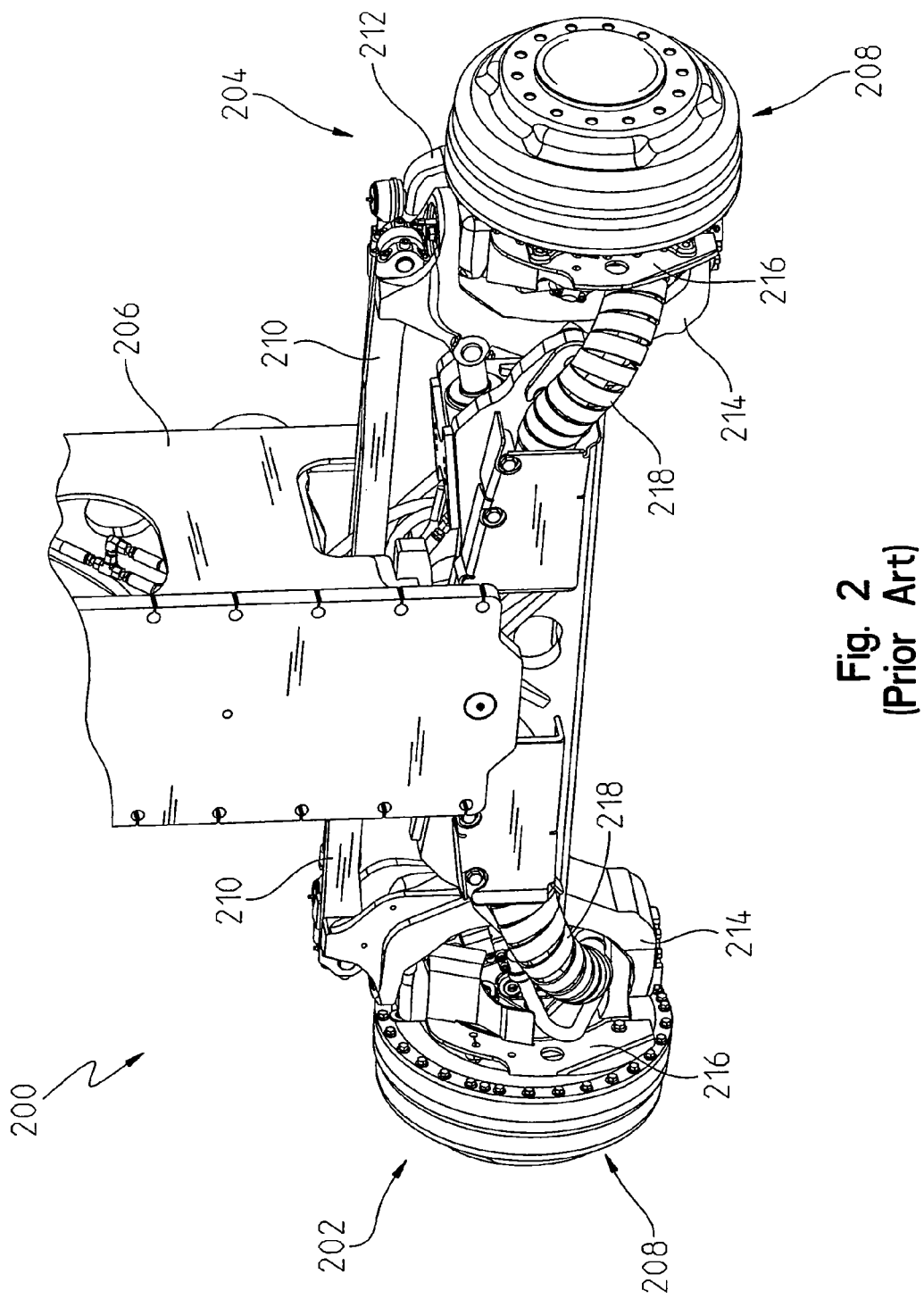
FIG. 2 is a perspective view of a front axle of the conventional motor grader of FIG. 1.
Figure 3:
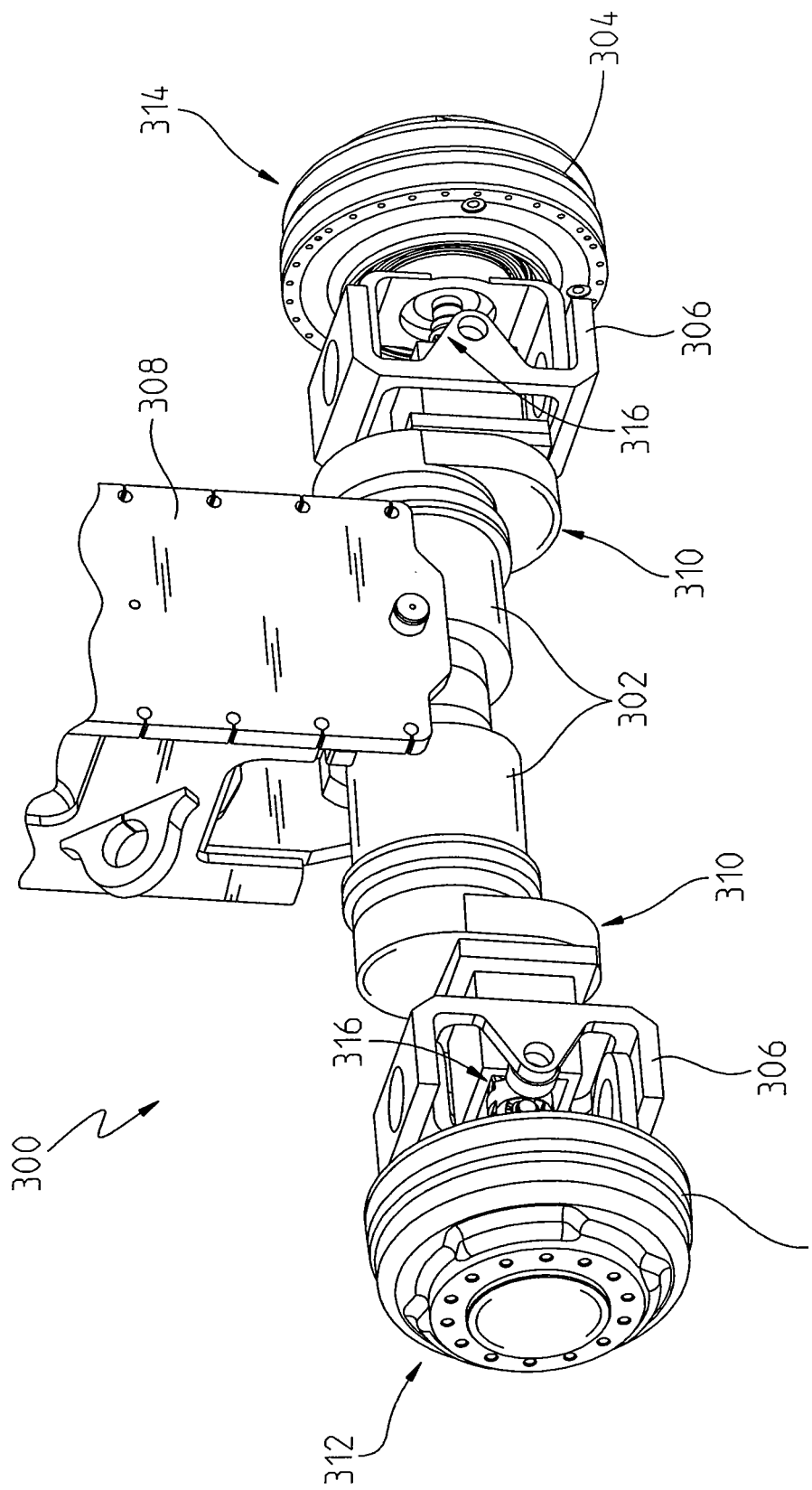
FIG. 3 is a perspective view of a front axle of a motor grader having a new design to accommodate an electric drive application.

In the present disclosure, many of the disadvantages described above regarding converting a conventional front axle to an electric drive application can be overcome with the front axle shown in FIG. 3. In FIG. 3, an exemplary embodiment of a front axle 300 coupled to a body frame 308 of a motor grader is shown. However, a similar design of the front axle 300 can be accommodated in other work machines as well. The front axle 300 includes a first side 312 and a second side 314 to which a traction device (e.g., wheel) is coupled. Each traction device (not shown) can be powered by an electric motor 302, of which there is a motor 302 for each side. With a larger motor size, the design of the front axle 300 is such that additional clearance is needed between the axle and the ground. In this embodiment, additional clearance can be provided by including a drop gearset 310 to form a portal axle. The drop gear set also provides a reduction in speed between the motor 302 and traction device. This will be described in further detail with respect to FIGS. 4 and 5.

The front axle 300 also includes a final drive assembly 304 at each end thereof for coupling to the traction device. The final drive assembly 304 is further coupled to a constant-velocity joint 316 to allow both steering and lean capabilities of the traction device. Wheel lean can be achieved by providing a lean casting or housing 306 which defines a lean axis (not shown). Similarly, a steering casting or housing (not shown) can define a steering axis (not shown). As will be further illustrated in FIGS. 4-6, the constant-velocity joint 316 is disposed at the intersection of the lean axis and steering axis.

Figure 4:
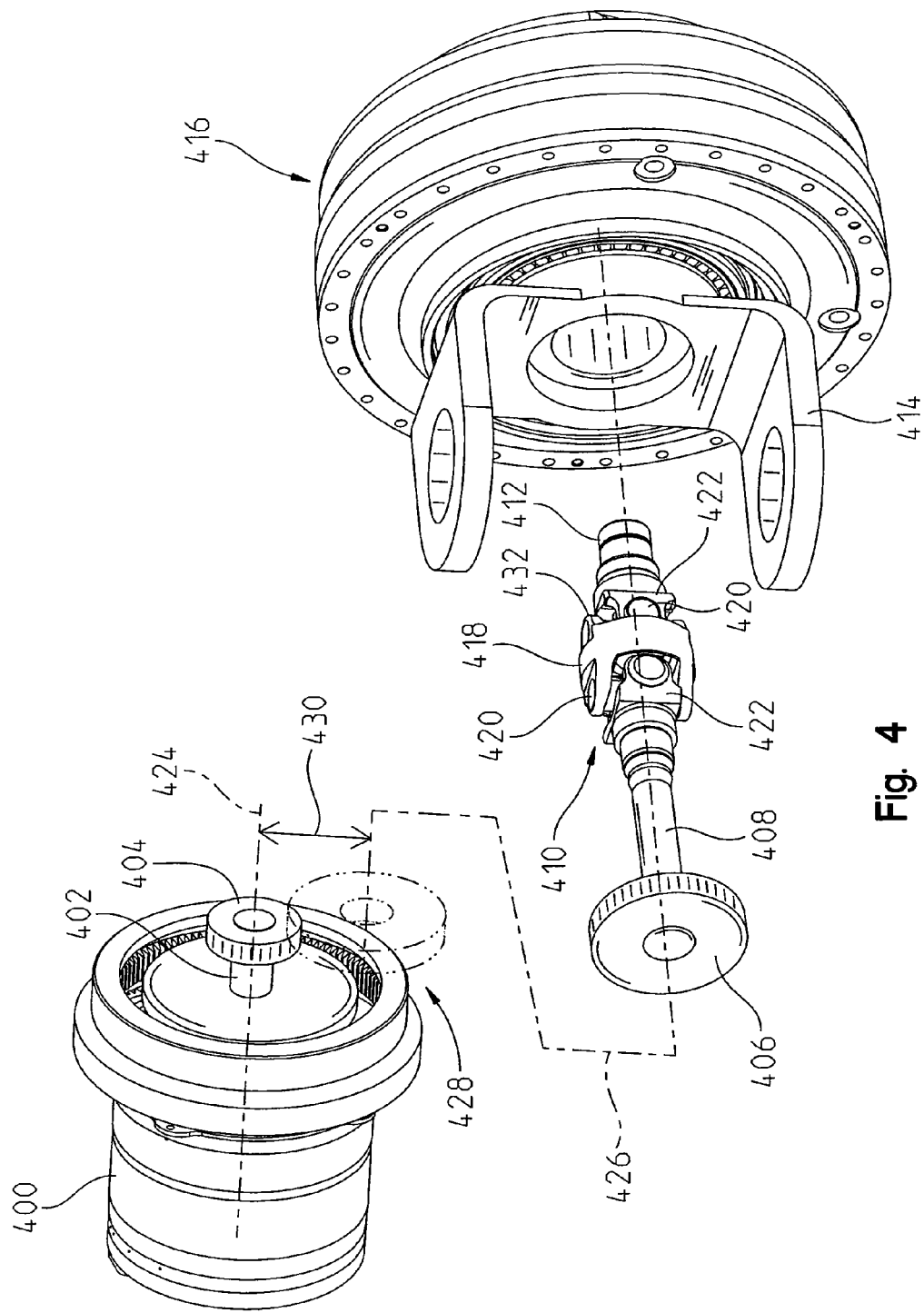
FIG. 4 is a partial exploded perspective view of a front axle.

Referring to FIG. 4, a portion of an exemplary axle for an electric drive application is shown. Here, the axle includes an electric power device 400 such as a motor for providing torque to a traction device (not shown). In particular, the power device 400 can include an output shaft 402 for transmitting torque to a final drive assembly 416. As shown, a first gear 404 is coupled to the output shaft 402. The first gear 404 and a second gear 406 form a portal or drop gearset 428. The first gear 404 is disposed along a first axis 424, which can be referred to as a motor axis, and the second gear 406 is disposed along a second axis 426, or wheel axis. The first axis 424 and second axis 426 are spaced from one another by an offset distance 430. The offset distance 430 can be defined by the sum of the radius of the first gear 404 and the radius of the second gear 406. The offset distance 430 can be adjusted by changing the size of either the first gear 404 or second gear 406, and therefore the clearance between the axle and the ground can be adjusted by this offset distance 430. Thus, the two gears effectively transfer power from a first centerline 424 to a second centerline 426.

The first gear 404 and second gear 406 can be designed with different diameters. For example, the diameter of the first gear 404 can be approximately 0.25-0.75 the diameter of the second gear 406. The two gears can be coupled to one another through their gear teeth so as to transfer torque from the power device 400 to the traction device (not shown). In addition, the first axis 424, upon which the first gear 404 is coupled, can be disposed substantially parallel to the second axis 426, upon which the second gear 406 is coupled.

The axle can include a constant-velocity joint 410 ("CV joint"). The CV joint 410 can be in the form of a cardan joint as known to a skilled artisan. The CV joint 410 is disposed between a dual drive shaft arrangement in which the first drive shaft 408 is disposed on one side thereof and a second drive shaft 412 is disposed on an opposite side. The second drive shaft 412 transfers torque from the CV joint 410 to the final drive assembly 416 which in turn drives the traction device. A spindle or housing 414 can be coupled to the final drive assembly 416 to support the traction device (not shown) for a front-wheel drive axle. The housing 414 can be coupled to a steering kingpin and a tie rod to provide the steering functionality of the axle.

Figure 6:
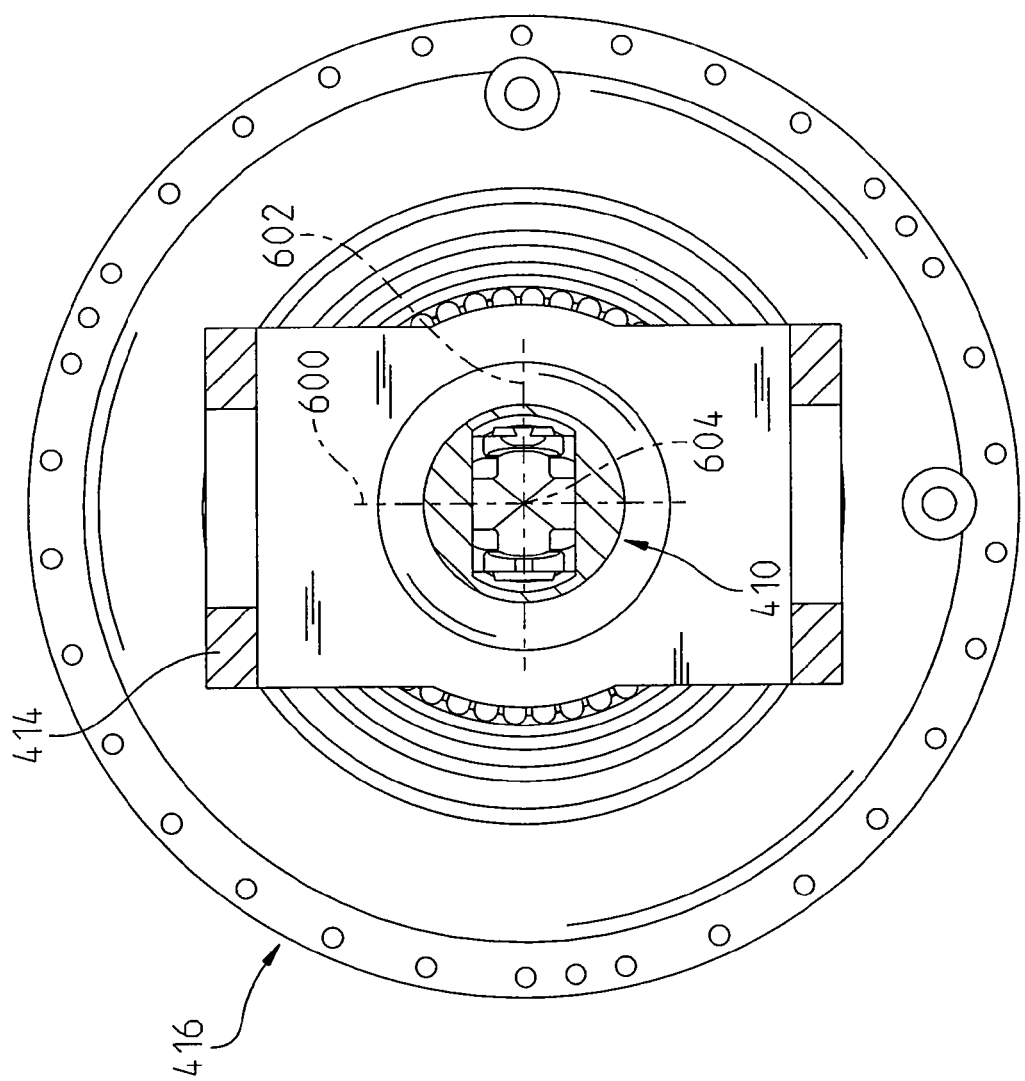
FIG. 6 is a partial cross-section of a steering pivot and lean pivot of the front axle of FIG. 4.

The CV joint 410 can include a joint body 418. The joint body 418 can include four flanges 432 which extend outwardly therefrom and each defines an opening for receiving a portion of a T-bar 420. There can be two flanges 432 on each side of the joint body 418 and therefore a T-bar 420 can be coupled to each side of the joint body 418. When coupled as an assembly, one T-bar 420 is disposed between the first drive shaft 408 and the joint body 418 and another T-bar 420 is disposed between the second drive shaft 412 and the joint body 418. The first drive shaft 408 and second drive shaft 412 both include a coupler at one end thereof for rotationally coupling to the respective T-bar 420. As such, the first drive shaft 408 and second drive shaft 412 can pivot about two axes with respect to each other. The two axes, the steering axis (or kingpin axis) 600 and wheel lean axis 602, are defined substantially perpendicular to one another. In addition, the second axis 426 is perpendicular to both the steering axis 600 and lean axis 602. The CV joint 410 is disposed at the intersection 604 of the steering axis 600 and lean axis 602 as shown in FIG. 6. In this arrangement, power flow from the power device 400 to the traction device can be maintained through the CV joint 410 without changing the drive shaft length.

Figure 5:
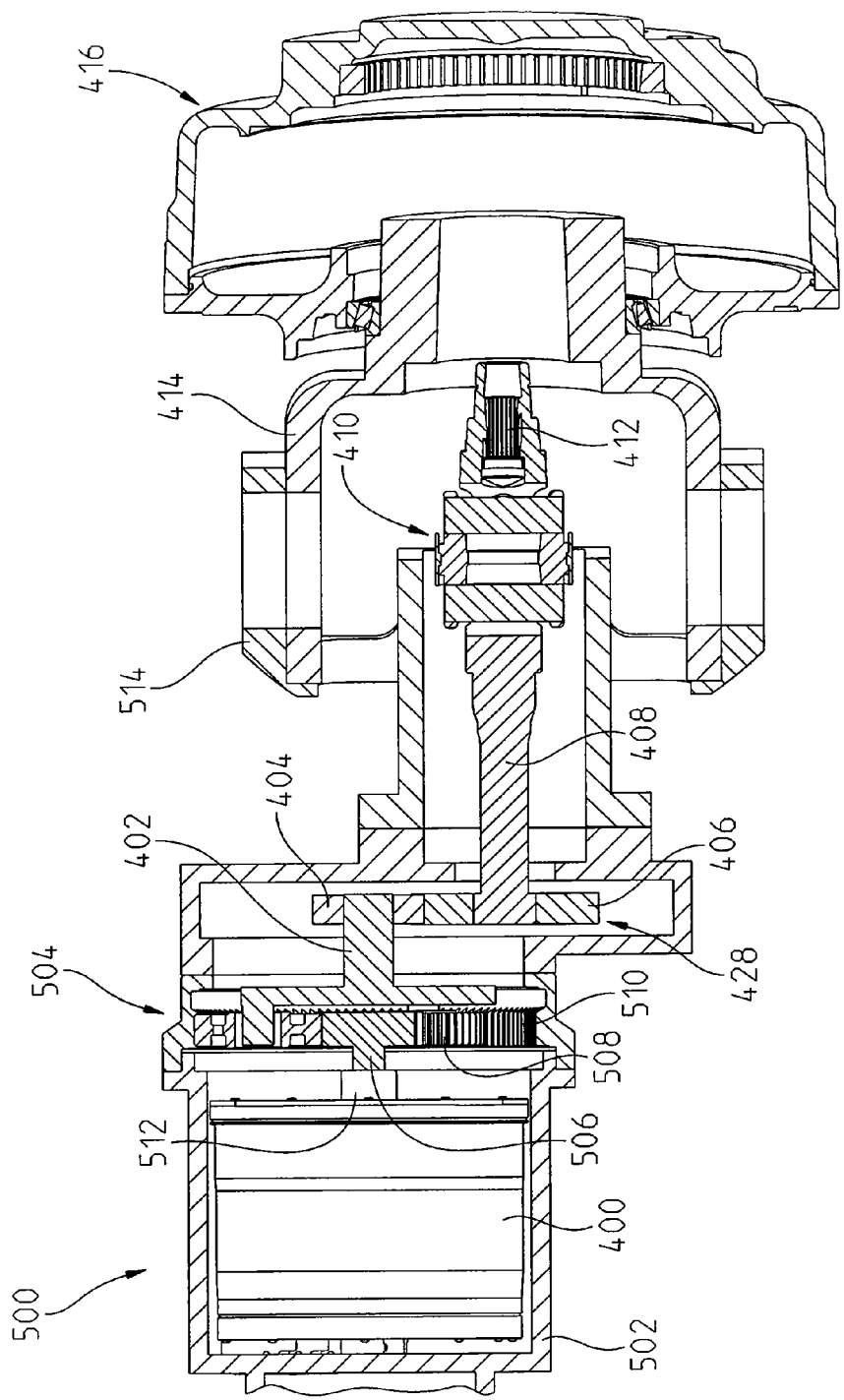
FIG. 5 is a partial cross-section of the front axle of FIG. 4.

Referring to FIG. 5, a lean casting 514 is shown for an axle 500 similar to the one shown in FIG. 4. The lean casting 514 can provide the lean functionality of the traction device and places the lean pivot point on top of the dual drive shaft. Although not shown, the lean casting 514 can include a lean bar and lean cylinder coupled thereto to provide the advantages of this design.

The axle 500 can also include an outer frame portion 502 which at least partially surrounds the power device 400 and a gear reduction mechanism 504. An example of a gear reduction mechanism is a planetary gearset 504. The planetary gearset 504 can include a sun gear 506, a ring gear 510, and a carrier having a plurality of pinion gears 508. The planetary gear 504 can provide protection to the cardan joint which may not be robust enough to operate at the same rotational speed as being output by the power device 400. In operation, the power device 400 can include an output 512 which transfers torque to the sun gear 506. The sun gear 506 can be coupled via splines, for example, to the output 512. The shaft 402 can be coupled to the output of the planetary gearset 504. In one instance, the shaft 402 can be coupled to the ring gear 510. In other instance, the shaft 402 can be coupled to the planetary carrier 508. The configuration may depend on the amount of desired gear reduction for a given application.

With the CV joint 410 disposed at the intersection 604 of the steering axis 600 and lean axis 602, the axle is able to achieve full rotational motion about both axes. In a motor grader, for example, the front wheel moves about several degrees of freedom. The location of the CV joint 410 at the intersection 604 can allow the front wheel to move about all steering and lean angles, and also reduce or prevent axial movement in the axis.

Also, if the size of the power device 400 is greater than a conventional hydraulic motor, for example, the positioning of the power device 400 at or near the center of the axle can ease the packaging constraint of the axle. In other words, if the work machine is desirably converted from a hydrostatic to an electric drive configuration, the power device can be repackaged near the center of the axle (rather than directly mounted to the traction device) to reduce packaging constraints. This also allows the machine to maintain its full performance as pivot points are not repositioned. In addition, wires to and from the power device can be better protected and the entire vehicle wiring system can maintain its integrity with the power device being repackaged at or near the center of the axle.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A front axle of a vehicle, comprising:
a motor disposed near a center of the axle;
a shaft coupled at one end thereof to the motor, where the shaft defines a first axis;
a first gear coupled to a second gear, the first gear being coupled to the shaft at an end opposite the motor and being disposed along the first axis;
the second gear disposed along a second axis, where the first axis and second axis are substantially parallel to but spaced from one another;
a final drive assembly coupled to the second gear at one end of the axle;
a steering pivot defining a steering axis about which the final drive assembly pivots;
a wheel lean pivot defining a lean axis about which the final drive pivots, the lean axis being substantially perpendicular to the steering axis; and
a constant-velocity joint disposed at an intersection of the steering axis and lean axis.

2. The front axle of claim 1, wherein the motor is an electric motor.

3. The front axle of claim 1, further comprising a second motor disposed adjacent the first motor near the center of the axle.

4. The front axle of claim 3, further comprising:
- a second final drive assembly disposed at an end of the axle opposite the first drive assembly, the second final drive assembly being pivotal about a second steering axis and a second lean axis; and
- a second constant-velocity joint disposed at the intersection of the second steering axis and second lean axis.

5. The front axle of claim 4, wherein the second motor is disposed along the first axis and the second final drive assembly is disposed along the second axis.

6. The front axle of claim 1, wherein the steering axis is substantially perpendicular to the first and second axes.

7. The front axle of claim 1, wherein the first gear is integrally coupled to the shaft.

8. The front axle of claim 1, wherein a diameter of the first gear is approximately 0.25-0.75 a diameter of the second gear.

9. A front axle for a motor grader, the front axle having a first end and a second end, comprising:
- an electric motor disposed near a center of the front axle;
- a shaft coupled at one end to the motor;
- a portal gearset including a first gear coupled to a second gear, the first gear being coupled to the shaft at an end opposite the motor;
- a final drive assembly disposed at the first end and second end of the axle, the final drive assembly being coupled to the second gear and configured to couple to a front wheel;
- a steering pivot about which the final drive pivots, the steering pivot defining a steering axis;
- a wheel lean pivot defining a lean axis about which the final drive pivots, the lean axis being perpendicular to the steering axis; and
- a constant-velocity joint disposed at an intersection of the steering axis and lean axis.

10. The front axle of claim 9, wherein a diameter of the second gear is approximately twice a diameter of the first gear.

11. The front axle of claim 9, wherein the first gear is integrally coupled to the shaft.

12. The front axle of claim 9, wherein the first gear is disposed along a first axis and the second gear is disposed along a second axis, the first axis and second axis being substantially parallel to but offset from one another.

13. The front axle of claim 12, wherein the steering axis is substantially perpendicular to the first and second axes.

14. An electric drive motor grader, comprising:
- a front frame and a rear frame;
- a first axle and a second axle, the first axle being coupled to the front frame and the second axle being coupled to the rear frame;
- an electric motor disposed near a center of the first axle and a shaft coupled to the motor;
- a portal gearset including a first gear coupled to a second gear, the first gear being coupled to the shaft at an end opposite the motor;
- a final drive assembly disposed at the first end and second end of the first axle, the final drive assembly being coupled to the second gear and configured to couple to a front wheel;
- a steering pivot about which the final drive pivots, the steering pivot defining a steering axis;
- a wheel lean pivot defining a lean axis about which the final drive pivots, the lean axis being perpendicular to the steering axis; and
- a constant-velocity joint disposed at an intersection of the steering axis and lean axis.

15. The motor grader of claim 14, further comprising a second electric motor disposed adjacent the first motor near the center of the first axle.

16. The motor grader of claim 15, further comprising:
- a second final drive assembly disposed at an end of the first axle opposite the first drive assembly, the second final drive assembly being pivotal about a second steering axis and a second lean axis; and
- a second constant-velocity joint disposed at the intersection of the second steering axis and second lean axis.

17. The motor grader of claim 16, wherein the first gear is disposed along a first axis and the second gear is disposed along a second axis, the first axis and second axis being substantially parallel to but offset from one another.

18. The motor grader of claim 17, wherein the first and second electric motors are disposed along the first axis and the first and second constant-velocity joints are disposed along the second axis.

19. The motor grader of claim 17, wherein the steering axis is substantially perpendicular to the first and second axes.

20. The motor grader of claim 14, wherein a diameter of the first gear is approximately 0.25-0.75 a diameter of the second gear.

* * * * *